(12) United States Patent
Park et al.

(10) Patent No.: US 8,174,655 B2
(45) Date of Patent: May 8, 2012

(54) LIQUID CRYSTAL DISPLAY DEVICE AND METHOD OF FABRICATING THE SAME

(75) Inventors: Seoung Jin Park, Daegu (KR); Moo Hyoung Song, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1000 days.

(21) Appl. No.: 11/806,973

(22) Filed: Jun. 5, 2007

(65) Prior Publication Data

US 2008/0151169 A1    Jun. 26, 2008

(30) Foreign Application Priority Data

Dec. 22, 2006   (KR) .......................... 10-2006-0132299
Apr. 16, 2007   (KR) .......................... 10-2007-0037007

(51) Int. Cl.
   *G02F 1/1343*   (2006.01)
(52) U.S. Cl. ........................................ 349/141; 349/143
(58) Field of Classification Search .................. 349/139, 349/141, 143, 144
   See application file for complete search history.

(56) References Cited

U.S. PATENT DOCUMENTS

| | | | |
|---|---|---|---|
| 2005/0140897 A1* | 6/2005 | Kim ............................. | 349/141 |
| 2005/0243259 A1* | 11/2005 | Song et al. .................... | 349/143 |
| 2006/0001815 A1* | 1/2006 | Kim et al. ..................... | 349/141 |
| 2006/0203166 A1* | 9/2006 | Inoue et al. ................... | 349/129 |
| 2007/0046882 A1* | 3/2007 | Chen et al. .................... | 349/141 |
| 2007/0058123 A1* | 3/2007 | Um et al. ...................... | 349/144 |
| 2007/0159566 A1* | 7/2007 | Kang ............................. | 349/41 |

FOREIGN PATENT DOCUMENTS

| | | | |
|---|---|---|---|
| JP | 2005250228 A | * | 9/2005 |
| KR | 1020060115818 A | * | 10/2006 |
| KR | 10-2006-0115818 | | 11/2006 |

* cited by examiner

*Primary Examiner* — Mark Robinson
*Assistant Examiner* — Jerry Blevins
(74) *Attorney, Agent, or Firm* — Morgan, Lewis & Bockius LLP

(57) ABSTRACT

A liquid crystal display device includes first and second substrates, gate and data lines formed on the first substrate and crossing each other to define a pixel region, a first common electrode in a first part of the pixel region, the first common electrode having a plate shape, a plurality of first pixel electrodes directly over the first common electrode and at a first fixed interval in the first part of the pixel region, a second pixel electrode alternately arranged with a second common electrode at a second fixed interval in a second part of the pixel region, and a layer of liquid crystal molecules between the first and second substrates.

22 Claims, 11 Drawing Sheets

LIQUID CRYSTAL DISPLAY DEVICE AND METHOD OF FABRICATING THE SAME

This application claims the benefit of Korean Patent Application No. 10-2006-132299 filed on Dec. 22, 2006 and Korean Patent Application No. 10-2007-037007 filed on Apr. 16, 2007, which are hereby incorporated by reference in their entirety.

BACKGROUND OF THE INVENTION

1. Field of the Invention

Embodiments of the present invention relates to a liquid crystal display (LCD) device, and more particularly, to an LCD device and a method of fabricating the same. Although embodiments of the invention are suitable for a wide scope of applications, it is particularly suitable for obtaining a rapid response speed and a high aperture ratio.

2. Discussion of the Related Art

In general, active matrix (AM) LCD devices have high speed and are widely used for flat type televisions, mobile computers and monitors. Among the AM LCD devices, a twisted nematic (TN) mode LCD device is typically used, in which two electrodes are respectively formed on two substrates. When a voltage is applied across the two electrodes, directors of the liquid crystal are realigned with a twist of 90°. The TN mode LCD device has attracted attention due to its advantageous display properties, such as great contrast and high resolution. However, the TN mode LCD device also has the problem of a narrow viewing angle.

To overcome this problem of TN mode LCD device having a relatively narrow viewing angle, other devices have been proposed for use, such as in-plane switching (IPS) mode LCD device and fringe field switching (FFS) mode LCD device. In the IPS mode LCD device, two electrodes are formed on one substrate such that the directors of the liquid crystal are twisted between surfaces of alignment layers. In the FFS mode LCD device, common and pixel electrodes are formed of transparent conductors and a small interval is maintained between the common and pixel electrodes such that liquid crystal molecules are driven by a fringe field generated between the common and pixel electrodes.

Both the IPS and FFS modes have a similar operation method in that each of the IPS and FFS modes includes the electrodes formed on one substrate that receive the applied operating voltages. However, the arrangement of electrodes of the IPS mode is different from that of the FFS mode. Hereinafter, a related art LCD device will be described with reference to the accompanying drawings.

FIG. 1 is a plan view of illustrating the related art FFS mode LCD device. Referring to FIG. 1, the related art FFS mode LCD device includes gate lines 3 and data lines 7 of opaque metal crossing each other to define a pixel region (P), a common line 10a parallel to the gate line 3, a thin film transistor (TFT) adjacent to the crossing of the gate lines 3 and data lines 7, a counter electrode 2 having a plate shape formed and made of a transparent conductor in the pixel region (P), and a pixel electrode 9a overlapping the counter electrode 2 and having the shape of comb including a plurality of teeth.

The thin film transistor (TFT) includes a semiconductor layer (not shown) formed over a predetermined portion of the gate line 3, a source electrode 7a protruding from the data line 7, and a drain electrode 7b formed at a predetermined interval from the source electrode 7a. The source and drain electrodes 7a and 7b are positioned at both sides of the semiconductor layer. The pixel electrode 9a is formed as one body with an extension part 9b so that the pixel electrode 9a is electrically connected with the drain electrode 7b such that the respective end portions corresponding to the comb teeth of pixel electrode 9a are connected with one another by the extension part 9b. Thus, the drain electrode 7b is electrically connected with the extension part 9b by the contact part.

The common line 10a includes common electrodes 10b, which are positioned adjacent to the data lines 7 at the both sides of pixel region P. The common line 10a and common electrode 10b is electrically connected with the counter electrode 2. At this time, the common electrode 10b is offset from the pixel electrode 9a and a portion of counter electrode 2.

In the FFS mode having the above-mentioned electrode structure, the counter electrode 2 is formed throughout the pixel region (P), and the counter electrode 2 is formed in a different layer from the pixel electrode 9a. Thus, the fringe field is formed between the pixel electrode 9a and the counter electrode 2, wherein the fringe field is formed with the electric field being curved toward the counter electrode 2 from the center of pixel electrode 9a. The electric field may be also formed in the overlap portion between the counter electrode 2 and the pixel electrode 9a. As the LCD device is turned-on, the liquid crystal is largely moved based on the electric field. A large operating voltage is required because the liquid crystal molecules need to be greatly moved. Unless the operating voltage is sufficiently large to control the liquid crystal, the response speed is relatively lower so that an afterimage phenomenon occurs.

As shown in the drawings, the plurality of pixel electrodes 9 may be connected with one another by the extension part 9b formed at one end of pixel electrode 9. In addition, another extension part having a bar shape may be formed at the other end of pixel electrode 9. That is, the pixel electrode 9 may be a plate provided with a plurality of slits. To solve the afterimage problem, the IPS mode LCD device is more widely used.

FIG. 2 is a plan view of illustrating the related art IPS mode LCD device. Referring to FIG. 2, the related art IPS mode LCD device includes gate lines 21 and data lines 20 crossing each other to define a pixel region (P), a thin film transistor (TFT) which is formed adjacent to the crossing of the gate lines 21 and data lines 20 to switch on/off a voltage, pixel electrodes 28a and common electrode 29a alternate with each other in the pixel region (P), a common line 22 is formed parallel to the gate line 21, an extension part 28 electrically connects the a drain electrode of thin film transistor with the pixel electrodes 28a as one body, and a common electrode connection part 29 connects the common electrodes 29a as one body. The thin film transistor (TFT) includes a gate electrode 23 which protrudes from the gate line 21, a semiconductor layer (not shown) over the gate electrode 23, a source electrode 25 protruding from the data line 20, and a drain electrode 27 positioned at a predetermined interval from the source electrode 25. The source and drain electrodes 25 and 27 are positioned at both sides of the semiconductor layer.

In the related art IPS mode LCD device of the above-mentioned structure, the IPS mode electric field occurs between the pixel electrodes 28a and the common electrodes 29a that alternate with each other at intervals, whereby the liquid crystal molecules are driven by the IPS mode electric field. In this case, the liquid crystal molecules are not smoothly driven just above the pixel electrodes 28a and the common electrodes 29a since the electric field is not formed above the pixel electrodes 28a and the common electrodes 29a.

Accordingly, the related art LCD device has the following disadvantages. While applying the voltage across the common and pixel electrodes in the related art IPS mode LCD device, the in-plane electric field is not formed just above the common and pixel electrodes. Thus, the liquid crystal molecules are not properly driven just above the common and pixel electrodes such that the aperture ratio and light transmittance are lowered. In the related art FFS mode LCD device where the counter electrode of plate shape is formed throughout the area of pixel region, and slitted or fingered pixel electrode is formed thereon, a large operating voltage is required to move the liquid crystal molecules. Unless the operating voltage is sufficiently large to control the liquid crystal, the response speed of liquid crystal is low and it is difficult to obtain the rapid response speed for displaying moving images. As a result of not obtaining a rapid response speed, an afterimage can occur on the display panel.

SUMMARY OF THE INVENTION

Accordingly, embodiments of the present invention are directed to an LCD device and a method of manufacturing the same that substantially obviates one or more problems due to limitations and disadvantages of the related art.

Another object of the present invention is to provide an LCD device and a method of manufacturing the same to obtain a high aperture ratio.

An object of the present invention is to provide an LCD device and a method of manufacturing the same to obtain rapid response.

An object of the present invention is to provide an LCD device and a method of manufacturing the same to obtain a wide viewing angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes first and second substrates facing each other, gate and data lines formed on the substrate and crossing each other to define a pixel region, a first common electrode in a first part of the pixel region, the first common electrode having a plate shape, a plurality of first pixel electrodes directly over the first common electrode and at a first fixed interval in the first part of the pixel region, a second pixel electrode alternately arranged with a second common electrode at a second fixed interval in a second part of the pixel region, and a layer of liquid crystal molecules between the first and second substrates.

In another embodiment, a liquid crystal display device includes first and second substrates facing each other, gate and data lines formed on the substrate and crossing each other to define a pixel region, a first common electrode in a center part of the pixel region, the first common electrode having a plate shape, a plurality of first pixel electrodes formed directly over the first common electrode and provided at a first fixed interval in the center part of the pixel region, second pixel electrodes alternately arranged with second common electrodes at a second fixed interval in upper and lower parts of the pixel region, and a layer of liquid crystal molecules between the first and second substrates.

In another embodiment, a liquid crystal display device includes first and second substrates facing each other, gate and data lines formed on the first substrate and crossing each other to define a pixel region, first common electrodes in upper and lower parts of the pixel region, the first common electrodes each having a plate shape, a plurality of first pixel electrodes formed directly over each of the first common electrodes and provided at a first fixed interval in the upper and lower parts of the pixel region, second pixel electrodes alternately arranged with second common electrodes at a second fixed interval in a center part of the pixel region, and a layer of liquid crystal molecules between the first and second substrates.

In a further embodiment, a method of fabricating a liquid crystal display device includes preparing first and second substrates, forming gate and data lines formed on the first substrate that cross each other to define a pixel region, forming a first common electrode in a first part of the pixel region, the first common electrode having a plate shape, forming a plurality of first pixel electrodes directly over the first common electrode and at a first fixed interval in the first part of the pixel region, forming a second pixel electrode alternately arranged with a second common electrode at a second fixed interval in a second part of the pixel region, and forming a layer of liquid crystal molecules between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, an LCD device according to the present invention and a method of manufacturing the same will be explained with reference to the accompanying drawings.

Figure 1:
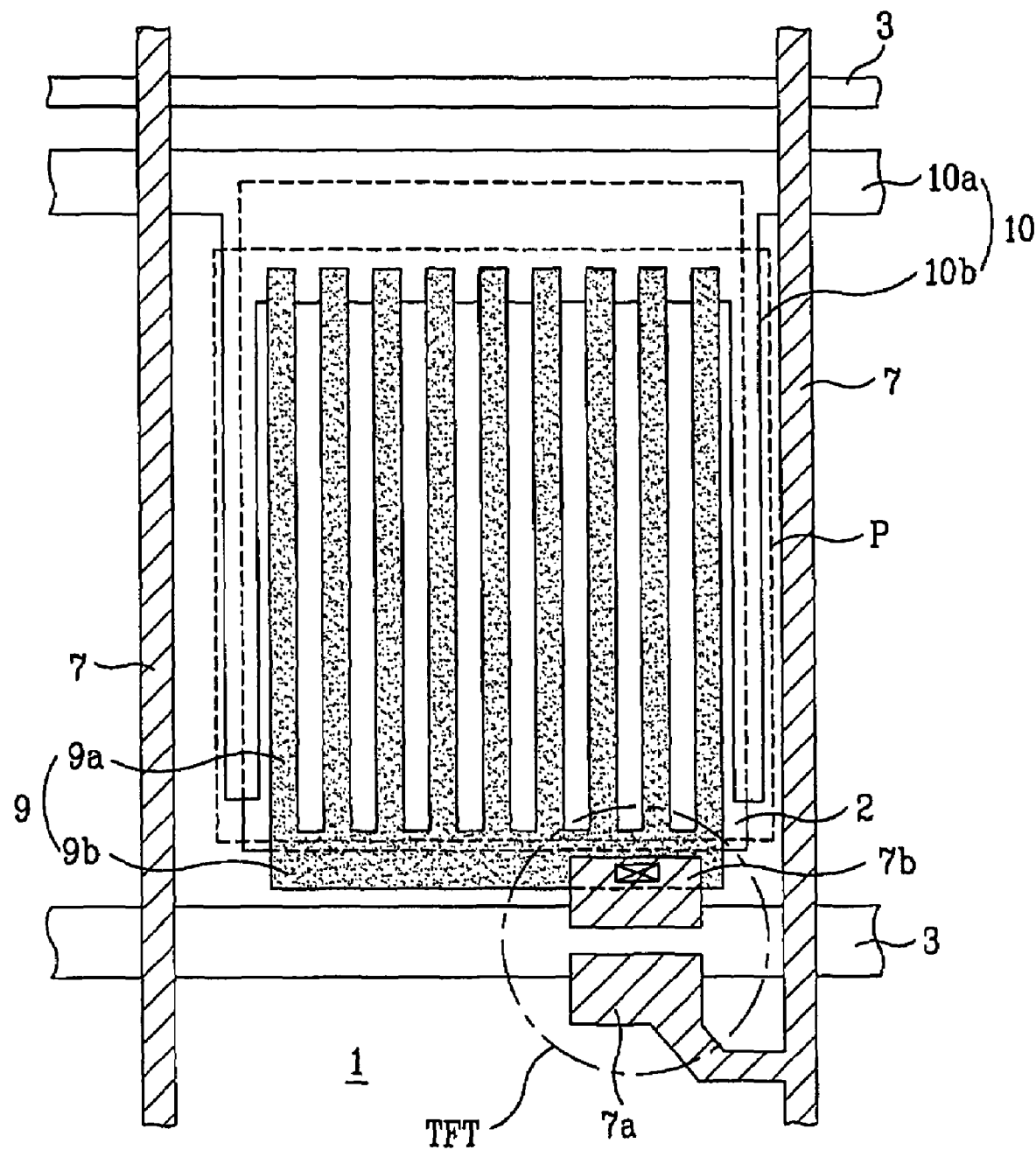
FIG. 1 is a plan view of illustrating the related art FFS mode LCD device.
Figure 2:
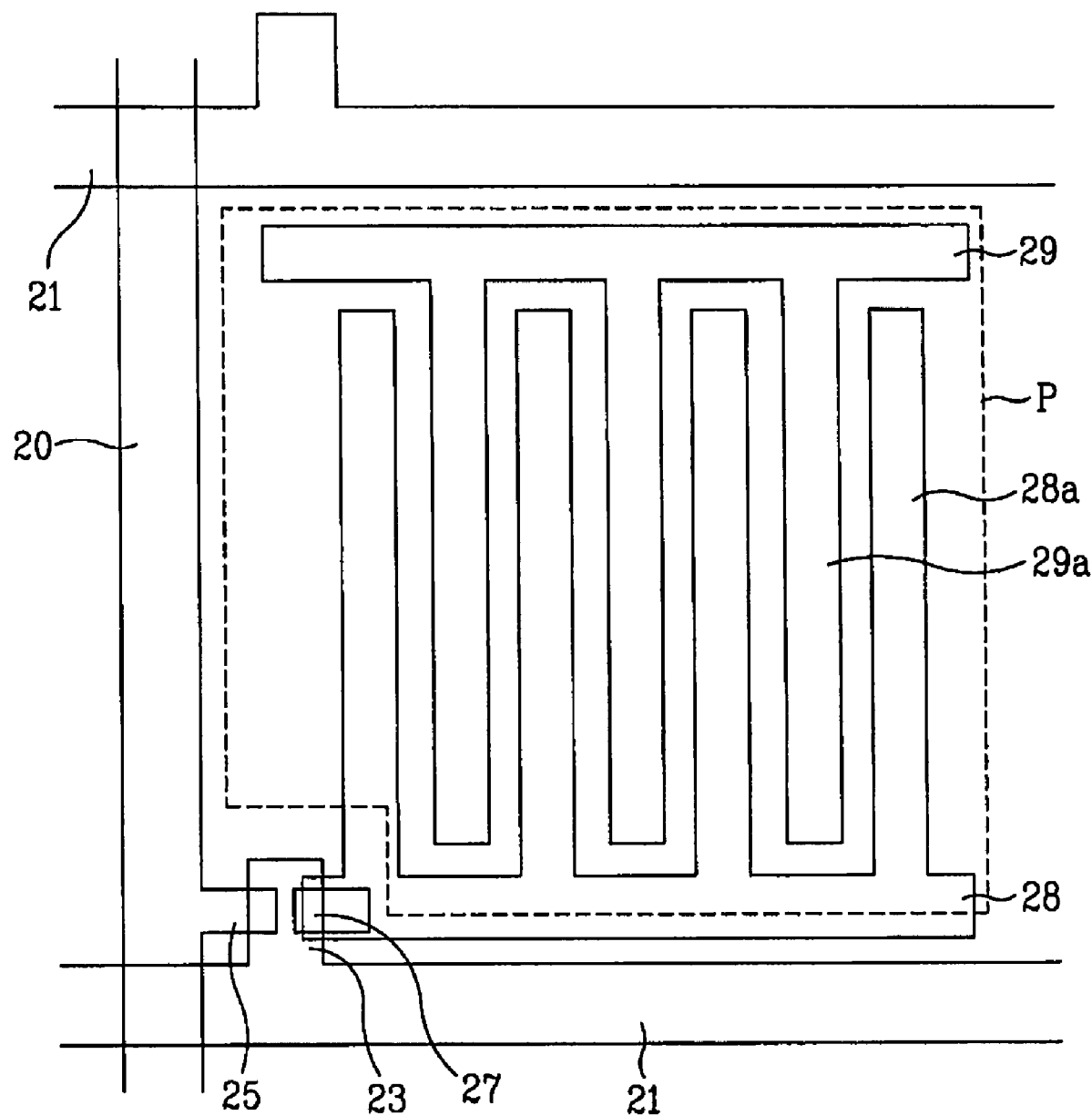
FIG. 2 is a plan view of illustrating the related art IPS mode LCD device.
Figure 3:
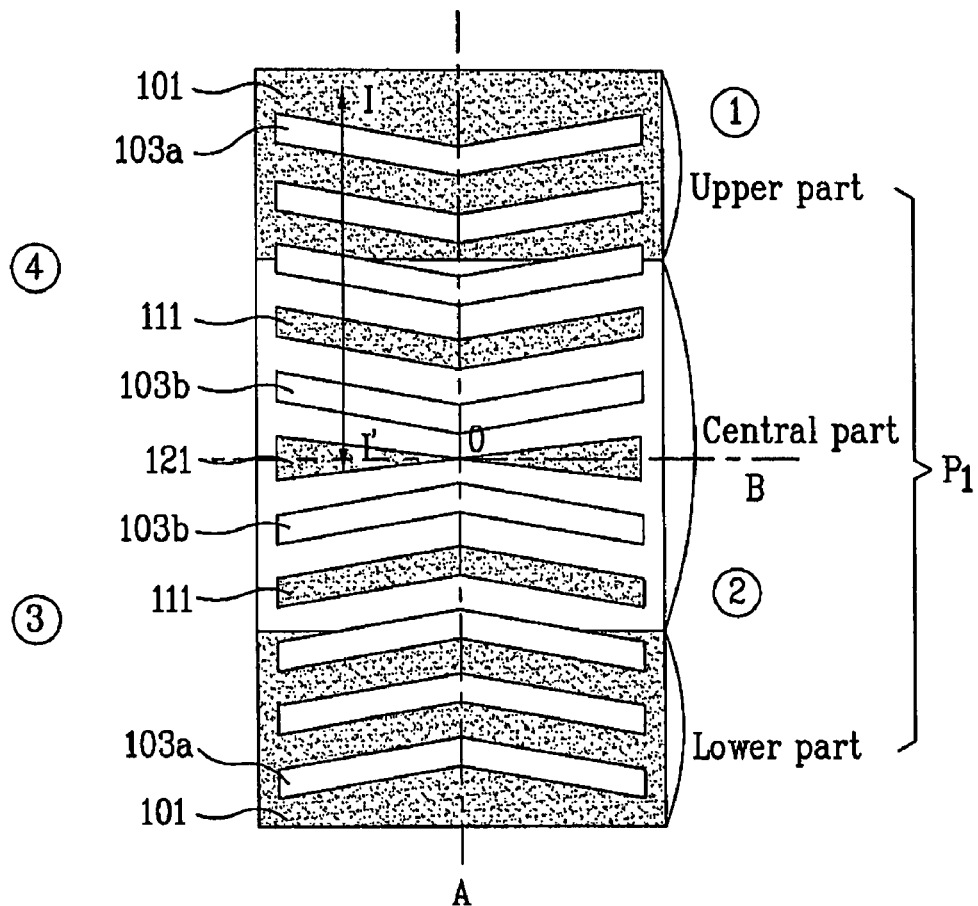
FIG. 3 is a plan view of illustrating an electrode shape of one pixel of an LCD device according to a first embodiment of the present invention.
Figure 4:
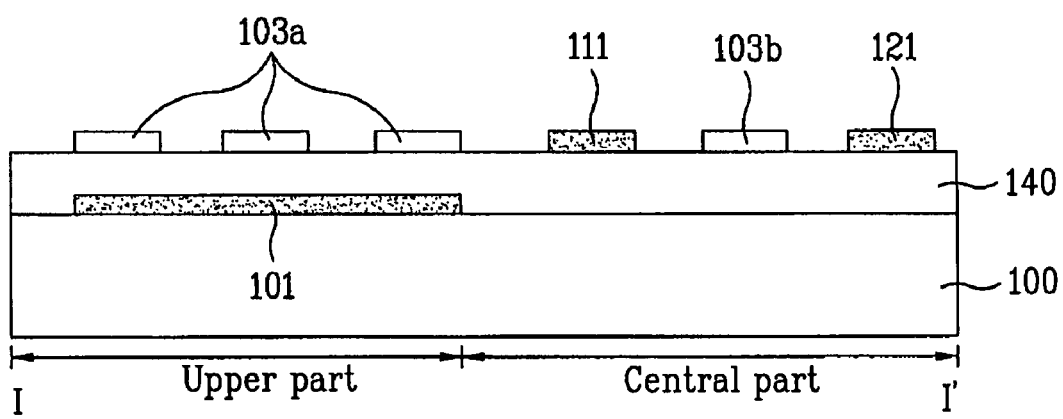
FIG. 4 is a cross-sectional view along line I-I' of FIG. 3.

FIG. 3 is a plan view of illustrating an electrode shape of one pixel of an LCD device according to a first embodiment of the present invention. FIG. 4 is a cross-sectional view along line I-I' of FIG. 3. As shown in FIGS. 3 and 4, the LCD device according to the first embodiment of the present invention includes a substrate 100, another opposing substrate (not shown), a gate line (not shown, 131 of FIG. 9) and a data line (not shown, 132 of FIG. 9) crossing each other on the substrate 100 to define a pixel region P1 including lower, central and upper parts, a thin film transistor formed adjacent to a crossing point of the gate line 131 and data lines 132, first common electrodes 101 having a plate shape formed in the lower and upper parts of the pixel region P1, first pixel electrodes 103a formed at intervals directly over the first common electrodes 101, second pixel and common electrodes 103b and 111 alternately formed in the central part of the pixel region P1, a first connector (not shown) electrically connecting the first pixel electrode 103a with the second pixel electrode 103b, a second connector (not shown) to electrically connecting the first common electrode 101 with the second common electrode 111, and a layer of liquid crystal molecules (not shown) formed between the two opposing substrates.

The first pixel electrode 103a, the second pixel electrode 103b, the first common electrode 101 and the second common electrode 111 may be formed of transparent materials, such as indium tin oxide (ITO), indium zinc oxide (IZO) or indium tin zinc oxide (ITZO). As the liquid crystal molecules are driven above and between the electrodes by the above-mentioned transparent electrodes, the light passes through the transparent electrodes so as to prevent the aperture ratio or transmittance from being lowered. The first pixel electrode 103a and the second pixel electrode 103b may be formed in the same layer, as shown in FIG. 4. In the alternative, the first pixel electrode 103a and the second pixel electrode 103b may be formed in different layers by patterning the second pixel electrode 103b together with the first common electrode 101.

As shown in FIG. 4, the first common electrode 101 and the second common electrode 111 may be formed in the different layers. In the alternative, the first common electrode 101 and the second common electrode 111 may be formed in the same layer. In either case, the first pixel electrodes 103a, the second pixel electrodes 103b, the first common electrode 101 and second common electrodes 111 are formed of the transparent electrodes while the first common electrode 101 and the first pixel electrodes 103a are formed in different layers. This is because the first common electrode 101 is formed as a plate shape in the lower and upper parts of the pixel region P1. That is, there is not enough space in the layer of first common electrode 101 to form the first pixel electrodes 103a.

The first pixel electrodes 103a, the second pixel electrode 103b and the second common electrode 111 are formed as bent-shaped structures. More specifically, the first pixel electrodes 103a in the upper part of pixel region P1 are formed as (rightward and leftward) symmetric bent-shapes pointing in a first direction while the first pixel electrodes 103a in lower part of the pixel region P1 are also formed as (rightward and leftward) symmetric bent-shapes pointing in a second direction opposite to the first direction. Further, the second pixel electrodes 103b in the central part of the pixel region P1 are formed as (rightward and leftward, upward and downward) symmetric bent-shapes pointing in both the first and second directions with respect to the center point 'O' of pixel region. The second pixel electrodes 103b in the central part of the pixel region P1 are parallel with the second common electrodes 111 formed in the central part of the pixel region P1. Also, the second common electrodes 111 are parallel with an adjacent the first pixel electrode 103a. There is also a third common electrode 121 formed with two opposite isosceles triangles symmetric with the center point of pixel region P1 in the horizontal direction, as shown in FIG. 3. Alternatively, the third common electrode 121 may be taken out.

Although not shown, the third common electrode 121 includes a third connector (not shown) which is electrically connected with the first common electrode 101 and the second common electrode 111. The same voltage is applied to the first common electrodes 101, second common electrodes 111 and third common electrode 121 to drive the liquid crystal molecules in the pixel region P1. The electric field in the lower and upper parts of the pixel region P1 with the first common electrode 101 having the plate shape is different from the electric field in the central part of pixel region P1 where the second common electrodes 111 are fingers.

In the lower and upper parts of the pixel region P1 where the first common electrode 101 is a plate shape, a fringe electric field is formed from the first pixel electrode 103a in accordance with bent-shape toward the first common electrode 101. Above the first pixel electrodes 103a, liquid crystal molecules are reoriented so as improve the aperture ratio and light transmittance. The first common electrodes 101 are respectively formed in the lower and upper parts of pixel region P1 and not in the central part of the pixel region P1. Also, the first pixel electrodes 103a are symmetrically formed in the lower and upper parts with respect to the central part of the pixel region P1 with their bent-shapes pointing in opposite direction so as to obtain increased viewing angles in the lower and upper directions, thereby widening the viewing angle.

In the central part of pixel region P1 where the first common electrode 101 is not a plate shape, the second pixel electrodes 103b alternates with the second common electrode 111 and have the same shape as the second common electrodes 111. Also, the second pixel electrodes 103b are symmetrically positioned with respect to the third common electrode 121, and the second common electrodes 111 are symmetrically positioned with respect to the third common electrode 121. Also, the second pixel electrode 103b and the second common electrode 111 are provided at intervals such that the IPS mode electric field occurs between the second pixel electrode 103b and the second common electrode 111 rapidly aligns liquid crystal molecules in parallel to the IPS mode electric field. Accordingly, the light transmittance and aperture ratio of the pixel region P1 are improved by combining the two types of electric fields to obtaining a wide viewing angle and rapid response speed.

Due to the fact that the first pixel electrodes 103a, second pixel electrodes 103b and the second common electrodes 111 are symmetric bent-shape with respect to the center point O of the pixel region, four domains corresponding to 1, 2, 3 and 4 parts are formed when operating voltages are applied to the electrodes (the first and second pixel electrodes, and the first and second common electrodes). So it is possible to gain a wide viewing angle.

Figure 9:
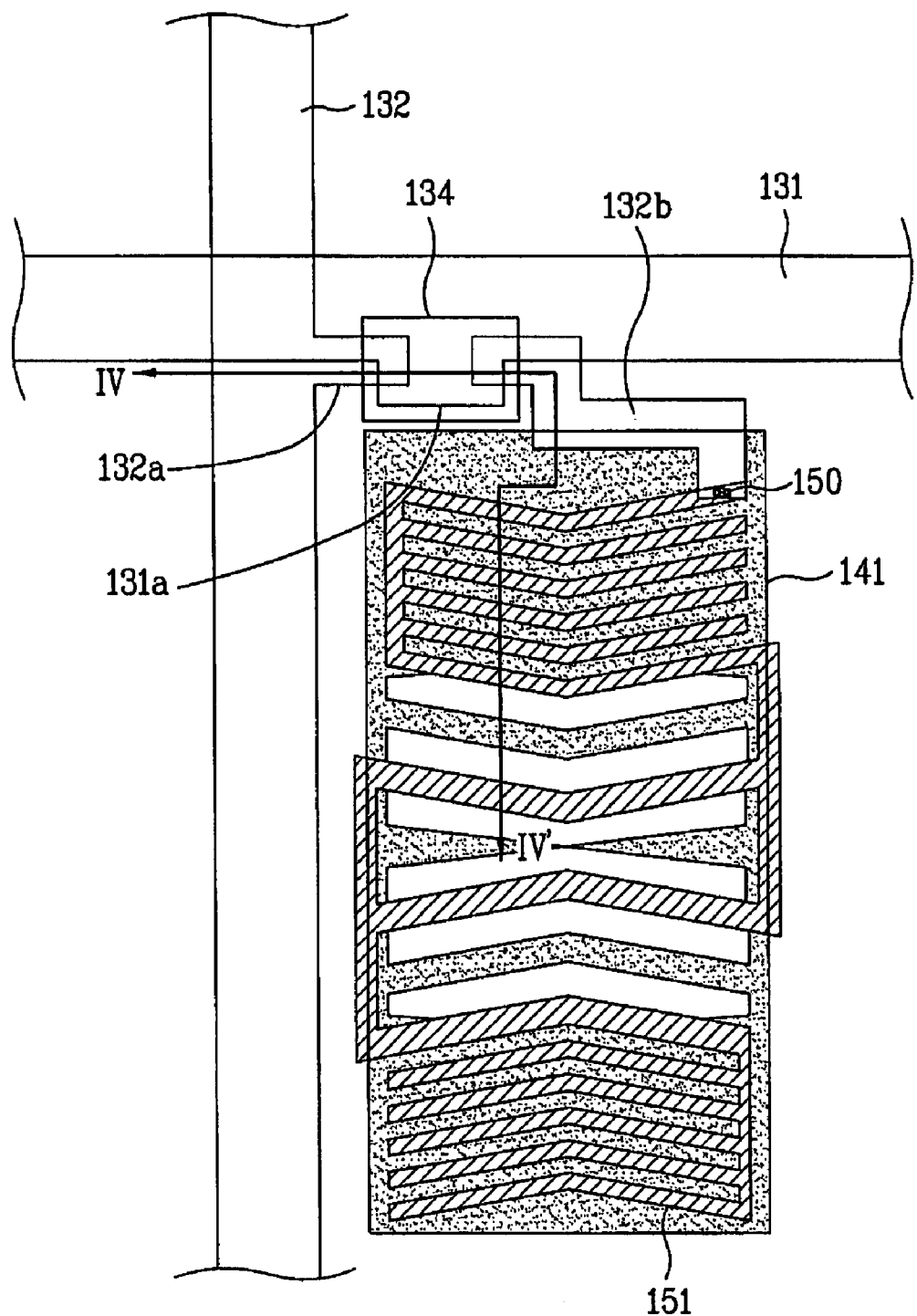
FIG. 9 is a plan view of illustrating an LCD device according to a fourth embodiment of the present invention.

In the LCD device according to the first embodiment of the present invention, the central part of the pixel region P1 has rapid response speed while the lower and upper parts of the pixel region P1 increase of aperture ratio and light transmittance since the edges of lower and upper parts of the pixel region P1 have good aperture ratio and light transmittance and the lower and upper parts of the pixel region P1 are symmetric with respect to the center point O of the pixel region P1. Further, each pixel region P1 has a wide viewing angle. In the electrode structure according to the first embodiment of the present invention, the transmittance is increased as compared with that of the related art IPS mode LCD device. In the aspect of response speed, if the first pixel electrodes 103a are positioned with small intervals on the first common electrode 101 and the interval between the first pixel electrodes 103 a is smaller than the interval between the second common electrode 111 and the second pixel electrode 103b, the intensity of fringe field is increased between the first common electrode 101 and the first pixel electrode 103a. Accordingly, when applying the operating voltage, the liquid crystal molecules in the lower and upper parts of the pixel region P1 are moved quickly while liquid crystal molecules in the central part of the pixel region P1 are operated by the IPS mode electric field generated among the second pixel electrode 103b, the second common electrode 111 and the third common electrode 121. Thus, it is possible to improve the response speed even though the same voltage level is applied to the LCD device according to the present invention as compared with the related art IPS mode LCD device. If the interval between adjacent first pixel electrodes 103a in the lower and upper parts of the pixel region P1 is smaller than the interval between adjacent second pixel electrode 103b and second common electrode 111, and is also smaller than the interval between adjacent second pixel electrode 103b and third common electrode 121, the intensity of fringe field is increased over the first common electrode 101, and the transmittance is increased about 19.44% as compared with that of the related art IPS mode LCD device (FIG. 9).

Figure 5:
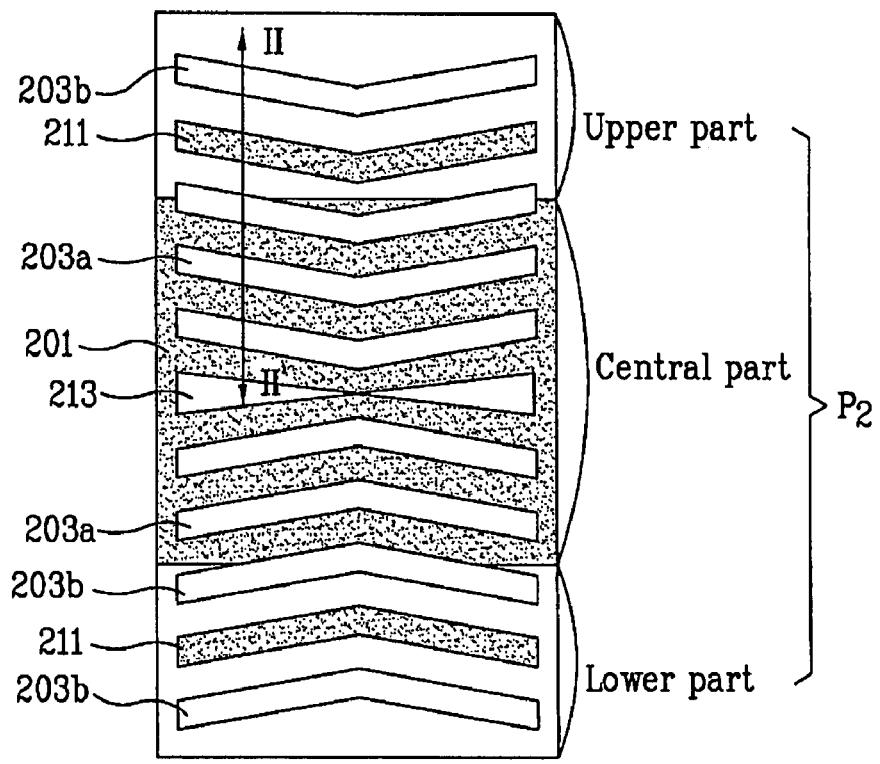
FIG. 5 is a plan view of illustrating an electrode shape of one pixel of an LCD device according to a second embodiment of the present invention.
Figure 6:
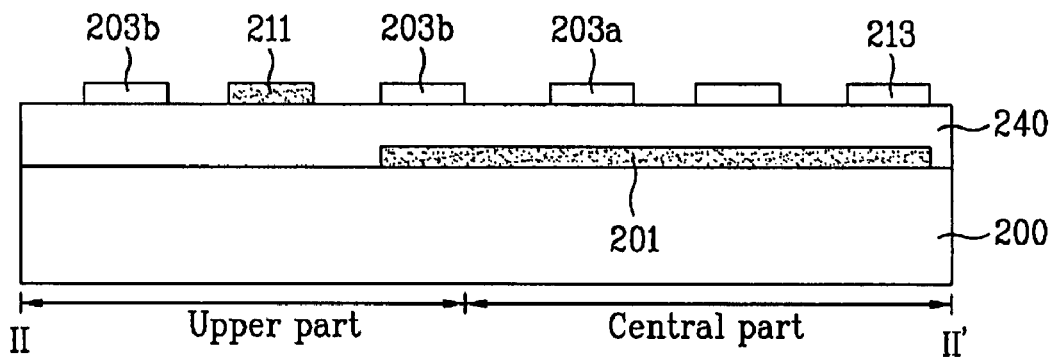
FIG. 6 is a cross-sectional view along line II-II' of FIG. 5.

FIG. 5 is a plan view of illustrating an electrode shape of one pixel of an LCD device according to the second embodiment of the present invention. FIG. 6 is a cross-sectional view along line II-II' of FIG. 5. Referring to FIGS. 5 and 6, the LCD device according to the second embodiment of the present invention includes a substrate 100, another opposing substrate (not shown), a gate line (not shown, 131 of FIG. 7) and a data line (not shown, 132 of FIG. 7) crossing each other on the substrate 100 to define a pixel region P2, including lower, central and upper parts, a thin film transistor (not shown) formed adjacent to the crossing of the gate lines 131 and data lines 132, a first common electrode 201 in the central part of the pixel region P2 and having a plate shape, first pixel electrodes 203a formed directly over the first common electrode 201 at intervals, second pixel and common electrodes 203b and 211 alternately formed in the lower and upper parts of the pixel region P2, a first connector (not shown) electrically connecting the first pixel electrode 203a with the second pixel electrode 203b, a second connector (not shown) to electrically connecting the first common electrode 201 with the second common electrode 211, and a layer of liquid crystal molecules (not shown) formed between the two opposing substrates.

The first pixel electrodes 203a, the second pixel electrodes 203b, the first common electrode 201 and the second common electrodes 211 can be formed of transparent material, such as indium tin oxide (ITO), indium zinc oxide (IZO) or indium tin zinc oxide (ITZO). When the liquid crystal molecules are driven by the above-mentioned transparent electrodes, the light passes through the transparent electrodes so as prevent the aperture ratio and light transmittance from being lowered. The first pixel electrode 203a and the second pixel electrode 203b may be formed in the same layer, as shown in FIG. 6. In the alternative, the first pixel electrodes 203a and the second pixel electrodes 203 may be formed in the different layers by patterning the second pixel electrode 203b together with the first common electrode 201.

As shown in FIG. 6, the first common electrode 201 and the second common electrodes 211 can be formed in different layers. In the alternative, the first common electrode 201 and the second common electrodes 211 may be formed in the same layer. In either case, the first pixel electrode 203a, second pixel electrodes 203b, the first common electrode 201 and second common electrodes 211 are formed of the transparent material while the first common electrode 201 and the first pixel electrodes 203a are formed in different layers. This is because the first common electrode 201 in the central part of the pixel region P2 has a plate shape. That is, there is not enough space in the layer of first common electrode 201 to form the first pixel electrodes 203a.

The first pixel electrodes 203a, the second pixel electrodes 203b and the second common electrodes 211 are formed as bent-shaped structures. More specifically, the second pixel electrode 203b in the upper part of the pixel region P2 are formed as symmetric bent-shapes pointing in a first direction while the second pixel electrode 203b in lower part of the pixel region P2 are also formed as symmetric bent-shapes pointing in a second direction opposite to the first direction. Further, the first pixel electrodes 203a in the central part of the pixel region P2 are formed as symmetric bent-shapes pointing in both the first and second directions. The second pixel electrodes 203b in the upper and lower parts of the pixel region P2 are parallel with the second common electrodes 211 formed in the central part of the pixel region P2. There is also a third pixel electrode 213 formed with two opposite isosceles triangles symmetric at the center point of pixel region P2 in the horizontal direction, as shown in FIG. 5. Also, the first pixel electrodes 203a are symmetrically positioned with respect to the third pixel electrode 213 formed along the central line of horizontal direction of the pixel region P2. The second pixel electrodes 203b and the second common electrodes 211 formed in the lower part of the pixel region P2 are symmetric with those formed in the upper part of the pixel region P2.

The interval between adjacent first pixel electrode 203a and third pixel electrode 213 is smaller than the interval between adjacent second pixel electrode 203b and second common electrode 211. Thus, the intensity of fringe field is increased over the first common electrode 201 such that the liquid crystal molecules are reoriented smoothly.

Although not shown, the third common electrode 213 includes a third connector (not shown) electrically connected to the first pixel electrode 203a and the second pixel electrode 203b. The same voltage is applied to the first pixel electrodes 203a, the second pixel electrodes 203b and the third pixel electrode 213 to drive the liquid crystal molecules in the pixel region P2.

In the LCD device according to the second embodiment of the present invention, the fringe field is formed in the central part of the pixel region P2, and the IPS mode field is formed in the lower and upper parts of the pixel region P2. The light transmittance and aperture ratio of pixel region P2 are improved by combining the two types of electric fields, while also obtaining a wide viewing angle and rapid response speed. In the electrode structure according to the second embodiment of the present invention, the transmittance is increased as compared with that of the related art IPS mode LCD device. Accordingly, when applying an operating voltage, the liquid crystal molecules in the central part of the pixel region P2 are moved quickly while liquid crystal molecules in the upper and lower parts of pixel region are operated by the IPS mode electric field generated among the second pixel electrode 203b, the second common electrode. In comparison with the related art IPS mode LCD device, the LCD device according to the present invention has rapid response speed.

Due to the fact that the first pixel electrodes 203a, second pixel electrodes 203b and the second common electrodes 211 are symmetric bent-shape with respect to the center point O of the pixel region, four domains corresponding to 1, 2, 3 and 4 parts are formed when operating voltages are applied to the electrodes (the first and second pixel electrodes, and the first and second common electrodes). So it is possible to obtain a wide the viewing angle.

Figure 7:
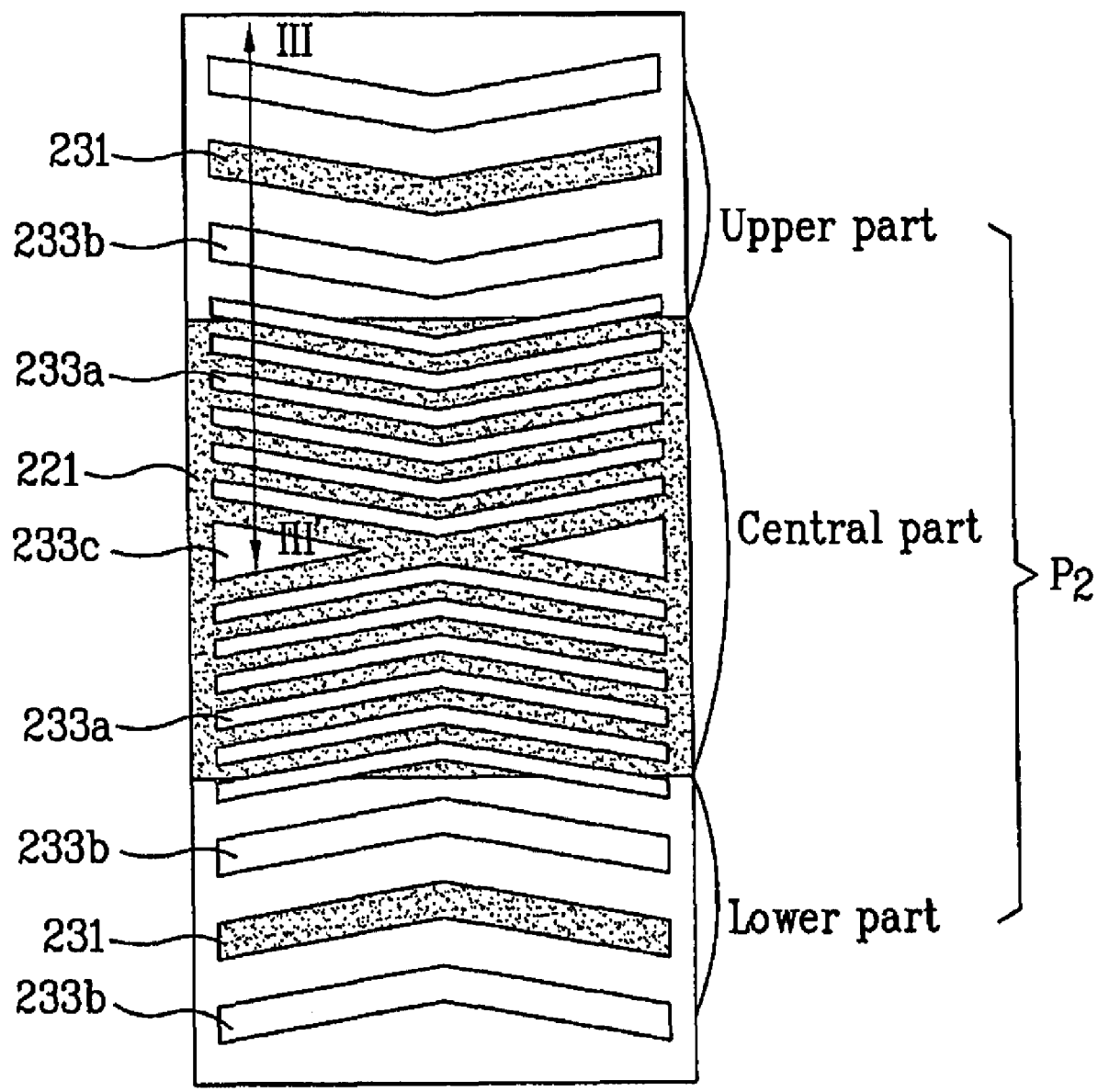
FIG. 7 is a plan view of illustrating an electrode shape of one pixel of an LCD device according to a third embodiment of the present invention.
Figure 8:
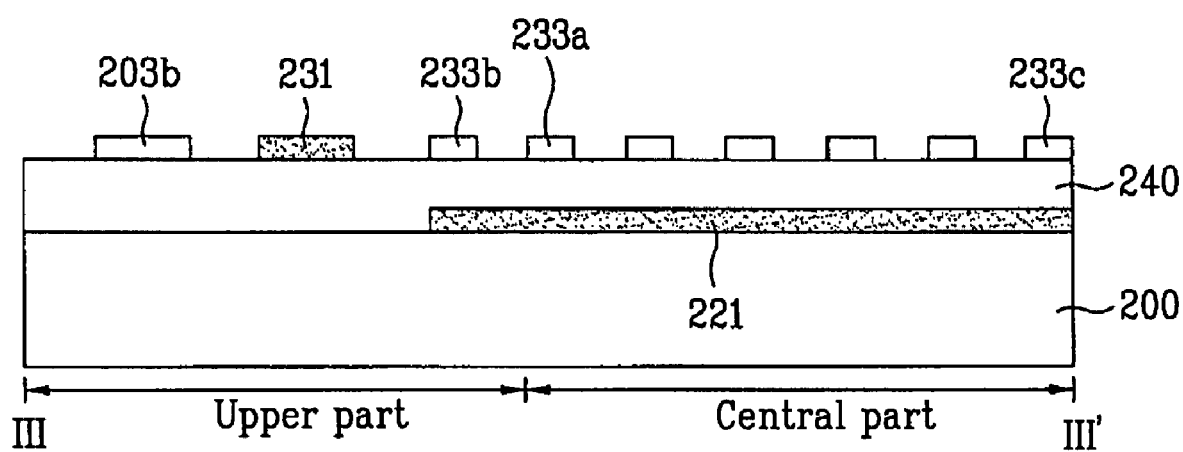
FIG. 8 is a cross-sectional view along line III-III' of FIG. 7.

FIG. 7 is a plan view of illustrating an electrode shape of one pixel of an LCD device according to the third embodiment of the present invention. FIG. 8 is a cross-sectional view along line III-III' of FIG. 7. Referring to FIGS. 7 and 8, the LCD device according to the third embodiment of the present invention includes a substrate 200, another opposing substrate (not shown), a gate line (not shown, 131 of FIG. 9) and a data line (not shown, 132 of FIG. 9) crossing each other on the substrate 200 to define a pixel region P3 including lower, central and upper parts, a thin film transistor (not shown) formed adjacent to a crossing of the gate lines 131 and data lines 132, a first common electrode 221 in the central part of the pixel region P3 having a plate shape, first pixel electrodes 233a formed directly over the first common electrode 221 at intervals, second pixel electrodes 233b and second common electrodes 231 alternately formed in the lower and upper parts of the pixel region P3, a first connector (not shown) electrically connecting the first pixel electrode 233a with the second pixel electrode 233b, a second connector (not shown) electrically connecting the first common electrode 221 with the second common electrode 231, and a layer of liquid crystal molecules (not shown) formed between the two opposing substrates.

The interval between adjacent two first pixel electrodes 233a, or a first pixel electrode 233a and third pixel electrode 233c is smaller than the interval between an adjacent second pixel electrode 233b and second common electrode 231. Thus, the intensity of fringe field is increased over the first common electrode 221 such that the liquid crystal molecules are smoothly reoriented by the fringe field. In the electrode structure according to the third embodiment of the present invention, the transmittance is increased by about 29.84% as compared with that of the related art IPS mode LCD device. In the aspect of response speed, if the first pixel electrodes 233a are positioned with small intervals on the first common electrode 221, the intensity of fringe field is increased among the first common electrode 221, the first pixel electrode 233a and the third pixel electrode 233c.

When applying the operating voltage, the liquid crystal molecules are operated by a FFS mode electric field in the central part of pixel region while the lower and upper parts of pixel region are operated by a IPS mode electric field between the second pixel electrode 233b and the second common electrode 231. In comparison with the related art IPS mode LCD device, the LCD device according to embodiments of the present invention has rapid response speed. Through control of the interval spacing between adjacent two first pixel electrodes as well as the width of the first pixel electrodes, it is observed that the transmittance is increased about 15~32% as compared with that of the related art IPS mode LCD device.

Figure 10:
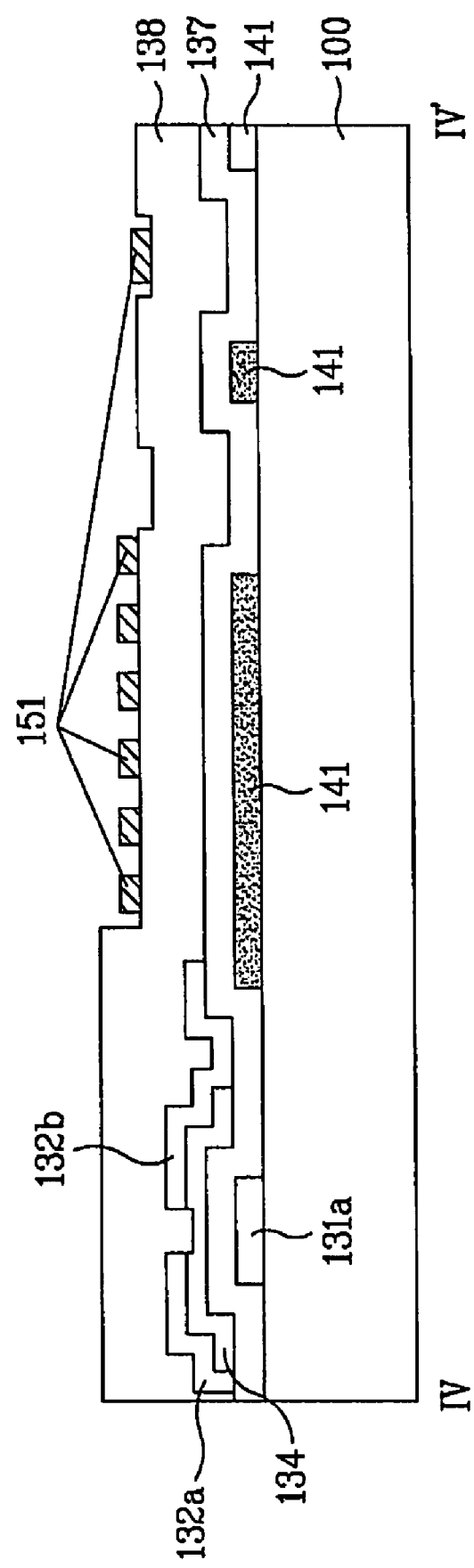
FIG. 10 is a cross-sectional view along IV-IV' of FIG. 9.

FIG. 9 is a plan view of illustrating an LCD device according to the fourth embodiment of the present invention. FIG. 10 is a cross-sectional view along line IV-IV' of FIG. 9. Referring to FIGS. 9 and 10, the LCD device according to the fourth embodiment of the present invention includes connectors which electrically connect the first and second pixel electrodes with each other, and other connectors which electrically connect the first to third common electrodes with one another. Also, the interval between adjacent two first pixel electrodes 103a in the lower and upper parts of the pixel region P4 is smaller than the interval between an adjacent second pixel electrode 103b and second common electrode 111, and is also smaller than the interval between an adjacent second pixel electrode 103b and third common electrode 121. Thus, the intensity of fringe field is increased over the first common electrode 101 such that the liquid crystal molecules are smoothly operated by the fringe field. As shown in FIGS. 9 and 10, the first and second pixel electrodes are formed as one body, and the first to third common electrodes are formed as one body. Also, the first and second pixel electrodes are formed in different layers than the first to third common electrodes.

Referring to FIGS. 9 and 10, the LCD device according to the third embodiment of the present invention includes a gate line 131, a data line 132, the common electrode 141, and the pixel electrode 15 1. The common electrode 141 has a plate shape formed in lower and upper parts of the pixel region P4 with slits in the center part of the pixel region to provide finger-shaped common electrodes 141 at an interval. Above the common electrode 141, a plurality of pixel electrodes 151 are formed at an interval. In the central part of pixel region, the finger-shaped pixel electrode 151 and common electrode 141 alternate with each other. The pixel electrodes 151 formed on the common electrode 141, and the pixel and common electrodes 151 and 141 formed in the central part of pixel region have a bent-shaped structure.

When dividing the pixel region into the lower and upper parts by the central line of horizontal direction, the electrodes of upper part are formed in a "V" shape, and the electrode of lower part are formed in inverted "Λ" shape. That is, the electrodes in the upper part are symmetric in shape with the electrodes of lower part. Along the central line of horizontal direction, there is a common electrode 141 which is formed with two opposite isosceles triangles being symmetric with the center point of pixel region, wherein the two isosceles triangles may be connected with each other, or may be apart from each other. In this case, the isosceles triangle may be any size based on the bent structure of pixel electrodes 151 provided in the lower and upper parts of pixel region.

The pixel electrodes 151 and common electrodes 141 are formed of transparent material, such as indium tin oxide (ITO), indium zinc oxide (IZO) or indium tin zinc oxide (ITZO), to thereby prevent the aperture ratio and light transmittance from being lowered. The pixel electrodes 151 are formed as one body such that the pixel electrodes 151 are electrically connected with one another. Also, the common electrodes 141 are formed as one body, whereby the common electrodes 141 are electrically connected with one another.

Then, a thin film transistor is formed adjacent to a crossing point of the gate line 131 and the data line 132. The thin film transistor includes a gate electrode 131a that protrudes from the gate line 131, a gate insulation layer 137 that is formed on the substrate 100 including the gate electrode 131, a semiconductor layer 134 which is formed on the gate insulation layer 137 above the gate electrode 131a, and source and drain electrodes 132a and 132b which are formed at both sides of the semiconductor layer 134. In addition, the semiconductor layer 134 is formed of an amorphous silicon layer and an impurity layer provided below the source and drain electrodes 132a and 132b.

The gate line 131 including the gate electrode 131a is formed of the different material from the common electrode 141. For example, the gate electrode 131a and the gate line 131 are patterned with the light-shielding metal material, and the common electrode 141 is patterned with transparent material.

A passivation layer 138 is formed on and between the source and drain electrodes 132a and 132b. The pixel electrode has a contact part 150 provided in a contact hole of the passivation layer to connect to the drain electrode 132b of pixel region. Thus, an electric signal can be applied to the pixel electrode through the drain electrode 132b.

Figure 11A:
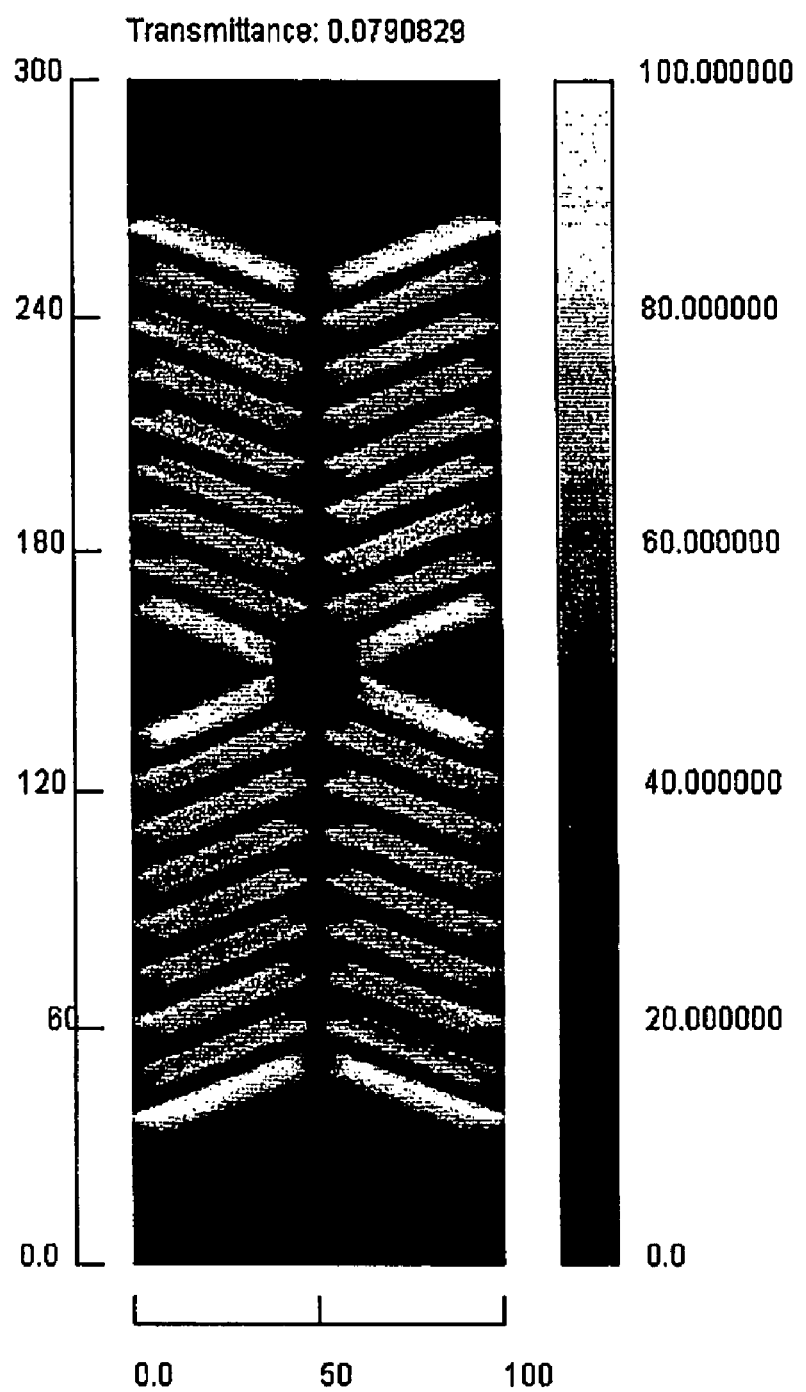
FIGS. 11A-11C are simulation views when operating voltages are applied to the electrodes in an IPS mode or the related art, the fourth embodiment and the third embodiment of the present invention, respectively.
Figure 11B:
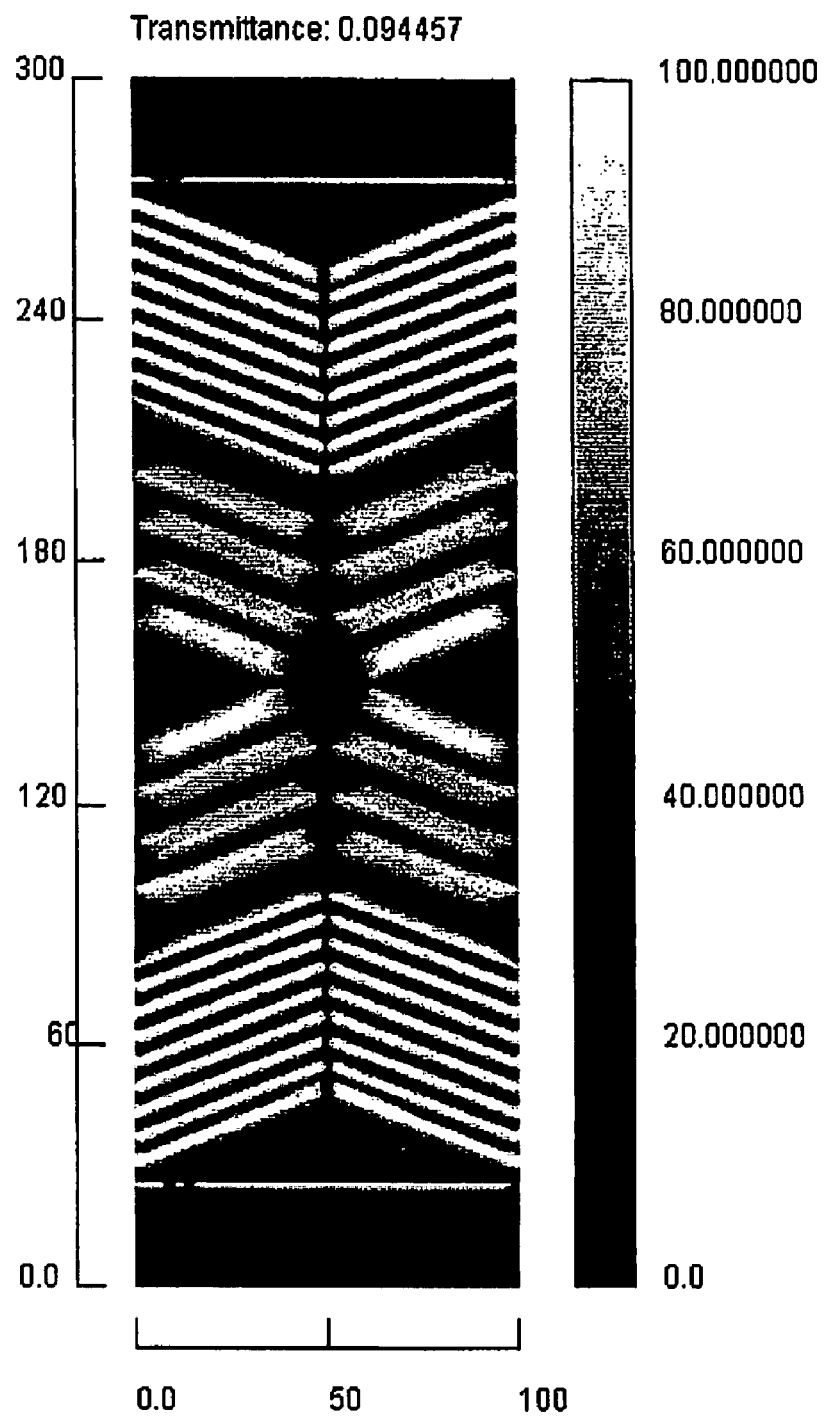
Figure 11C:
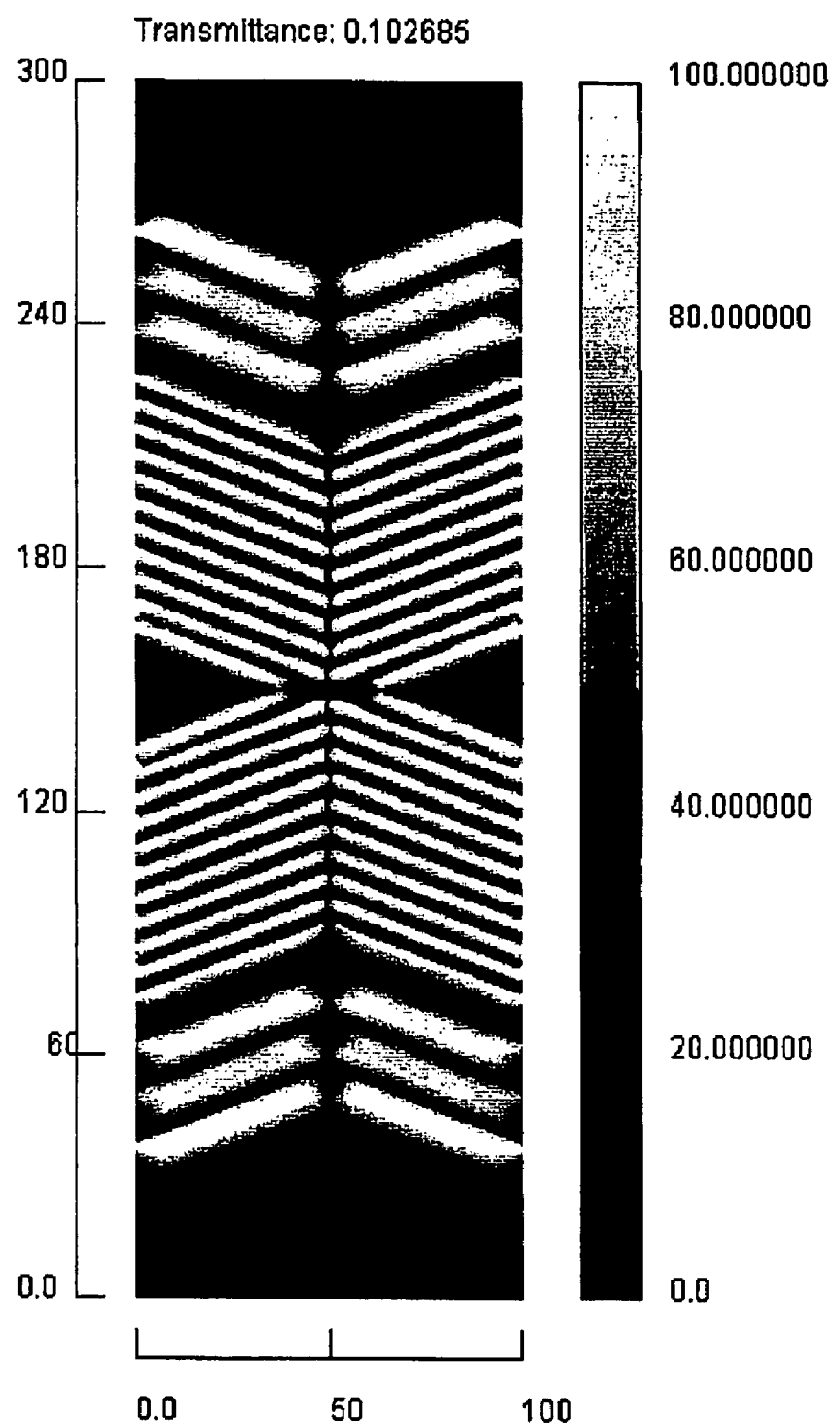

FIGS. 11A-11C are simulation views when operating voltages are applied to the electrodes in an IPS mode or the related art, the fourth embodiment and the third embodiment of the present invention, respectively.

Referring FIGS. 11A and 11B, it is found that the fourth embodiment of the present invention has a higher transmittance of about 19.44% (0.094457/0/0790829-1) than the IPS mode when operating voltages are applied to the electrodes. Also, referring FIGS. 11A and 11B, it is also found that the third embodiment of the present invention has a higher transmittance of about 29.84% (0.094457/0/0790829-1) than the IPS mode.

In the same method of the LCD device according to the first embodiment of the present invention, the LCD device according to the fourth embodiment of the present invention is operated by applying an operating voltage to drive the liquid crystal molecules. As mentioned above, the pixel region may be divided into the plurality of parts as well as the three parts described above. If the pixel region is divided into the plurality of parts, the first common electrode of plate shape is formed in parts of the pixel region alternating with parts of the pixel region having finger common electrodes. To make the viewing angle symmetric in the lower and upper directions when having the pixel region in the data line direction, the electrodes of the upper part (pixel and common electrodes) are symmetric with the electrodes of lower part.

As mentioned above, the LCD device according to embodiments of the present invention and the method of manufacturing the same has advantages. For example, because each pixel region is divided into a plurality of parts to include a FFS mode and IPS mode structures at the same time. When applying the operating voltage, the liquid crystal molecules are driven between first pixel electrodes and also above the first pixel electrodes formed over the first common electrode of plate shape such that the aperture ratio is improved. If the interval between the adjacent two of first pixel electrodes formed on the first common electrode of plate shape is smaller than the interval between the adjacent two of second pixel and common electrodes, the intensity of the fringe field is increased between the first pixel electrode and the first common electrode. Accordingly, as the intensity of electric field between the first pixel electrodes formed is increased over the first common electrode, the liquid crystal molecules are driven quickly above the first common electrode. So that the liquid crystal molecules corresponding to the region between the second pixel electrodes and the second common electrodes, adjacent to the first common electrode, are influenced by moving of the liquid crystal molecules above the first common electrode and more quickly driven so as to obtain rapid response. Also, electrodes in pixel region are symmetric bent-shape with respect to the center point of the pixel region, in such that four domains are formed with respect to the center point O of the pixel region when operating voltages are applied to the electrodes, so that the viewing angle is improved by the lower and upper parts and the right and left parts. As a result, the LCD device according to the present invention has high aperture ratio, good light transmittance, rapid response speed and wide viewing angle.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
first and second substrates facing each other;
gate and data lines formed on the first substrate and crossing each other to define a pixel region, wherein the pixel region is horizontally divided as upper part, center part and lower part;
a first common electrode in the upper part and the lower part of the pixel region, the first common electrode having a plate shape, wherein the first common electrode covers the upper and lower parts;
a plurality of first pixel electrodes directly over the first common electrode and at a first fixed interval in the upper and lower parts of the pixel region;
a second pixel electrode alternately arranged with a second common electrode at a second fixed interval in the center part of the pixel region, wherein the first and second common electrodes are formed on different layers;
an electrode having two opposite isosceles triangles symmetric with each other, wherein the electrode is positioned at a center line halving the pixel region at the direction of data line; and
a layer of liquid crystal molecules between the first and second substrates,
wherein a first width of each of the first pixel electrodes is less than a second width of the second pixel electrodes.

2. The liquid crystal display device according to claim 1, wherein the first common electrode and the second common electrodes are connected to each other, and the first pixel electrodes and the second pixel electrode are connected to each other.

3. The liquid crystal display device according to claim 1, wherein the first pixel electrodes and the second pixel electrode are formed in different layers.

4. The liquid crystal display device according to claim 1, the first fixed interval is smaller than the second fixed interval.

5. The liquid crystal display device according to claim 1, wherein the first pixel electrodes, the second pixel electrode and the second common electrode have a bent shape.

6. The liquid crystal display device according to claim 1, wherein the first pixel electrodes, the second pixel electrode, the first common electrode and the second common electrode include transparent electrodes.

7. The liquid crystal display device according to claim 1, wherein the pixel region forms first to fourth domains in operation, and the first and second domains, the second and third domains, the third and fourth domains, and the fourth and first domains are symmetric with each other.

8. A liquid crystal display device comprising:
first and second substrates facing each other;
gate and data lines formed on the first substrate and crossing each other to define a pixel region, wherein the pixel region is horizontally divided as upper part, center part and lower part;
a first common electrode in the upper part and the lower part of the pixel region, the first common electrode having a plate shape, wherein the first common electrode covers the upper and lower parts;
a plurality of first pixel electrodes directly over the first common electrode and at a first fixed interval in the upper and lower parts of the pixel region;
a second pixel electrode alternately arranged with a second common electrode at a second fixed interval in the center part of the pixel region, wherein the first common electrode and the second common electrode are in the same layer;
an electrode having two opposite isosceles triangles symmetric with each other, wherein the electrode is positioned at a center line halving the pixel region at the direction of data line; and
a layer of liquid crystal molecules between the first and second substrates,
wherein a first width of each of the first pixel electrodes is less than a second width of the second pixel electrodes.

9. The liquid crystal display device according to claim 8, wherein the first and second common electrodes are a single unit having a plate area for the upper and lower parts of the pixel region and a slit in the single unit in the center part of the pixel region.

10. A liquid crystal display device, comprising:
first and second substrates facing each other;
gate and data lines formed on the first substrate and crossing each other to define a pixel region, wherein the pixel region is horizontally divided as upper part, center part and lower part;
a first common electrode in the center part of the pixel region, the first common electrode having a plate shape, wherein the first common electrode covers the center part;
a plurality of first pixel electrodes formed directly over the first common electrode and provided at a first fixed interval in the center part of the pixel region;
second pixel electrodes alternately arranged with second common electrodes at a second fixed interval in the upper part and the lower part of the pixel region, wherein the first and second common electrodes are formed on different layers;
a third pixel electrode having two opposite isosceles triangles symmetric with each other, wherein the third pixel electrode is positioned centrally amongst the first pixel electrodes; and
a layer of liquid crystal molecules between the first and second substrates,
wherein a first width of each of the first pixel electrodes is less than a second width of each of the second pixel electrodes.

11. The liquid crystal display device according to claim 10, wherein the first common electrode and the second common electrodes are connected to each other, and the first pixel electrodes and the second pixel electrodes are connected to each other.

12. The liquid crystal display device according to claim 10, the first fixed interval is smaller than the second fixed interval.

13. The liquid crystal display device according to claim 10, wherein the second pixel electrodes in the upper part of pixel region are symmetric bent-shapes pointing in a first direction while the second pixel electrodes in lower part of pixel region are symmetric bent-shapes pointing in a second direction opposite to the first direction.

14. The liquid crystal display device according to claim 10, wherein the pixel region forms first to fourth domains in operation, and the first and second domains, the second and third domains, the third and fourth domains, and the fourth and first domains are symmetric with each other.

15. A liquid crystal display device, comprising:
first and second substrates facing each other;
gate and data lines formed on the substrate and crossing each other to define a pixel region, wherein the pixel region is horizontally divided as upper part, center part and lower part;
first common electrodes in the upper part and the lower part of the pixel region, the first common electrodes each having a plate shape, wherein the first common electrodes cover the upper and lower parts;
a plurality of first pixel electrodes formed directly over each of the first common electrodes and provided at a first fixed interval in the upper and lower parts of the pixel region;
a plurality of second pixel electrodes alternately arranged with a plurality of second common electrodes at a second fixed interval in the center part of the pixel region, wherein the first and second common electrodes are formed on different layers;
an electrode having two opposite isosceles triangles symmetric with each other, wherein the electrode is positioned at a center line halving the pixel region at the direction of data line; and
a layer of liquid crystal molecules between the first and second substrates,
wherein the first fixed interval is smaller than the second fixed interval and a first width of each of the first pixel electrodes is less than a second width of each of the second pixel electrodes.

16. The liquid crystal display device according to claim 15, wherein the first common electrodes and the second common electrodes are connected to each other, and the first pixel electrodes and the second pixel electrodes are connected to each other.

17. The liquid crystal display device according to claim 15, wherein the first pixel electrodes in the upper part of pixel region are symmetric bent-shapes pointing in a first direction while the first pixel electrodes in lower part of pixel region are symmetric bent-shapes pointing in a second direction opposite to the first direction.

18. The liquid crystal display device according to claim 15, wherein the first and second common electrodes are a single unit having a plate area for the upper and lower parts of the pixel region and slits in the single unit in the center part of the pixel region.

19. The liquid crystal display device according to claim 15, wherein the first pixel electrodes, the second pixel electrodes, the first common electrodes and the second common electrodes include transparent electrodes.

20. The liquid crystal display device according to claim 15, wherein the pixel region forms four domains in operation.

21. The liquid crystal display device according to claim 15, wherein the pixel region forms first to fourth domains in operation, and the first and second domains, the second and third domains, the third and fourth domains, and the fourth and first domains are symmetric with each other.

22. A method of fabricating a liquid crystal display device, comprising:
preparing first and second substrates;
forming gate and data lines on the first substrate that cross each other to define a pixel region, wherein the pixel region is horizontally divided as upper part, center part and lower part;
forming a first common electrode in the upper part and the lower part of the pixel region, the first common electrode having a plate shape, wherein the first common electrode covers the upper and lower parts;

forming a plurality of first pixel electrodes directly over the first common electrode and at a first fixed interval in the upper and lower parts of the pixel region;

forming a second pixel electrode alternately arranged with a second common electrode at a second fixed interval in the center part of the pixel region, wherein the first and second common electrodes are formed on different layers;

forming an electrode having two opposite isosceles triangles symmetric with each other, wherein the electrode is positioned at a center line halving the pixel region at the direction of data line; and forming a layer of liquid crystal molecules between the first and second substrates, wherein a first width of each of the first pixel electrodes is less than a second width of each of the second pixel electrode, wherein the pixel region is quartered as first to fourth domain, and the first and second domains, the second and third domains, the third and fourth domains, and the fourth and first domains are symmetric with each other.

* * * * *